United States Patent
Li et al.

(10) Patent No.: US 9,304,352 B2
(45) Date of Patent: Apr. 5, 2016

(54) TWO-WAY VIEWING ANGLE DISPLAY PANEL AND METHOD FOR FABRICATING THE SAME

(71) Applicant: BOE Technology Group Co., Ltd., Beijing (CN)

(72) Inventors: Wenbo Li, Beijing (CN); Wei Wei, Beijing (CN); Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 302 days.

(21) Appl. No.: 13/983,900

(22) PCT Filed: Dec. 23, 2012

(86) PCT No.: PCT/CN2012/087227
§ 371 (c)(1),
(2) Date: Aug. 6, 2013

(87) PCT Pub. No.: WO2014/005412
PCT Pub. Date: Jan. 9, 2014

(65) Prior Publication Data
US 2014/0111750 A1    Apr. 24, 2014

(30) Foreign Application Priority Data
Jul. 2, 2012 (CN) .......................... 2012 1 0228457

(51) Int. Cl.
*G02F 1/1335* (2006.01)
*H04N 13/04* (2006.01)
(Continued)

(52) U.S. Cl.
CPC ...... *G02F 1/133512* (2013.01); *G02B 27/2214* (2013.01); *G02F 1/1333* (2013.01); *H04N 13/0404* (2013.01); *Y10T 156/10* (2015.01)

(58) Field of Classification Search
CPC ........................ G02B 27/2214; H04N 13/0404
See application file for complete search history.

(56) References Cited

U.S. PATENT DOCUMENTS 7,420,637 B2 * 9/2008 Imai et al. ..................... 349/122
2008/0273148 A1  11/2008 Yoon et al.
(Continued)

FOREIGN PATENT DOCUMENTS

CN        1617014 C        5/2005
CN      101105579 A        1/2008
(Continued)

OTHER PUBLICATIONS

English language Abstract of CN100406964C; 1 page.
(Continued)

*Primary Examiner* — Phu Vu
(74) *Attorney, Agent, or Firm* — Ladas & Parry LLP

(57) ABSTRACT

A two-way viewing angle display pane and a method for fabricating the same are provided and relate to the display field. The method for fabricating the two-way viewing angle display panel comprises: providing a transparent substrate (17); forming a grating (18) made of a light-shield layer on the transparent substrate; forming a transparent adjusting layer (19) on the transparent substrate (17) having the grating (18) formed thereon; and sequentially forming a pixel layer (13) and a transparent conductive layer (20) on the transparent adjusting layer (19). The technical solution of the invention may optimize the two-way viewing angles and avoid the yield rate problem caused by the thinned substrate.

14 Claims, 3 Drawing Sheets

(51) Int. Cl.
*G02F 1/1333* (2006.01)
*G02B 27/22* (2006.01)

(56) References Cited

U.S. PATENT DOCUMENTS

| | | | |
|---|---|---|---|
| 2010/0033644 | A1 | 2/2010 | Hong et al. |
| 2012/0099215 | A1 | 4/2012 | Wu |
| 2014/0111750 | A1 | 4/2014 | Li et al. |

FOREIGN PATENT DOCUMENTS

| | | |
|---|---|---|
| CN | 101162311 B | 4/2008 |
| CN | 100406964 C | 7/2008 |
| CN | 101498858 B | 8/2009 |
| CN | 101750785 A | 6/2010 |
| CN | 201845777 U | 5/2011 |
| CN | 101644863 B | 8/2011 |
| CN | 102236201 A | 11/2011 |
| CN | 202110356 U | 1/2012 |
| CN | 202196246 A | 4/2012 |
| CN | 102768424 A | 11/2012 |
| JP | 2006330018 | 7/2006 |
| JP | 2008008934 A | 1/2008 |
| KR | 20060134897 A | 12/2006 |
| KR | 20080001938 A | 1/2008 |
| KR | 20080097752 A | 11/2008 |
| KR | 20120012994 A | 2/2012 |
| TW | 201120523 A | 6/2011 |

OTHER PUBLICATIONS

English language Abstract of CN202110356U; 1 page.
English abstract of KR20060134897A, 1 page.
Examination Opinion (Korean language) issued by the Korean Intellectual Property Office ("KIPO") issued on Sep. 5, 2014 for Application No. 10-2013-7022032, 4 pages.
English translation of Examination Opinion issued by KIPO, 3 pages.
English abstract of CN101498858A; one (1) page.
English abstract of CN101162311A; one (1) page.
International Preliminary Report on Patentability issued by The International Bureau of WIPO on Jan. 6, 2015 for International Application No. PCT/CN2012/087227, 9 pages.
International Search Report for International Application No. PCT/CN2013/077028 issued Dec. 27, 2013, 12pgs.
International Search Report for International Application No. PCT/CN2012/087227, 15pgs.
First Office Action issued by State Intellectual Property Office of the People's Republic of China for Chinese Patent Application No. 201210228457.9 dated Dec. 30, 2013, 6pgs.
English translation of First Office Action issued by State Intellectual Property Office of the People's Republic of China for Chinese Patent Application No. 201210228457.9 dated Dec. 30, 2013, 4pgs.
Koren Office Action dated Apr. 30, 2015; Appln. No. 10-2013-7022032.
Korean Notice of Allowance dated Jun. 30, 2015; Appln. No. 10-2013-7022032.

* cited by examiner

TWO-WAY VIEWING ANGLE DISPLAY PANEL AND METHOD FOR FABRICATING THE SAME

CROSS REFERENCE TO RELATED APPLICATIONS

This application is based on International Application No. PCT/CN2012/087227 filed on Dec. 23, 2012, which claims priority to Chinese National Application No. 201210228457.9, filed on Jul. 2, 2012, the contents of which are incorporated herein by reference.

FIELD OF THE ART

Embodiments of the invention relate to a two-way viewing angle display panel and its fabrication method.

BACKGROUND

In a two-way (also known as two-way video) viewing angle display, different images are displayed at different angles, that is to say, users may see different images on the display from different angels. As an example, the two-way display may be applied to in-vehicle display. With a two-way viewing angle display, passengers at different seats in the car may see different images on the same display. Therefore, it is not necessary to provide individual displays for each passenger, which will reduce costs of display arrangement and usage of in-vehicle space.

As illustrated in FIG. 1, a conventional two-way viewing angle display comprises: a first substrate 11, a liquid crystal layer 12, a pixel layer 13, a second substrate 14, a patterned-shield layer 15 and a transparent substrate 16, where the patterned-shield layer 15 comprises opaque light-shield layer patterns 151, 152, 153 and 154. Such a configuration produces two-way viewing angle display effect by means of the effect of the patterned-shield layer 15 of the two-way view angle display.

In the two-way viewing angle display configured as above, the patterned-shield layer 15 is attached to the second substrate 14. Therefore, the distance between the pixel layer 13 and the patterned-shield layer 15 is long, which narrows the two-way viewing angles and negatively affect the user experience. To increase the two-way viewable angles, in conventional technologies usually a thickness of the second substrate 14 is reduced to optimize the two-way viewable angles. However, reduction in the thickness of the second substrate 14 will produce various problems during manufacture, such as decrease in flatness of the substrate, breaking of the substrate, failure in liquid crystal filling and the like, and thus significantly reduces the yield rate (i.e. fine goods rate) of the products.

SUMMARY

Embodiments of the invention provide the following technical solutions.

In one aspect, an embodiment of the invention provides a method for fabricating a two-way viewing angle display panel, which comprises:
providing a transparent substrate;
forming a grating made of a light-shield layer on the transparent substrate;
forming a transparent adjusting layer on the transparent substrate having the grating formed thereon; and
sequentially forming a pixel layer and a transparent conductive layer on the transparent adjusting layer.

Furthermore, the step of forming a grating made of a light-shield layer on the transparent substrate comprises:
forming alignment marks for the grating and the pixel layer on the substrate at the same time by using the same mask plate.

Furthermore, the light-shield layer is a black metal layer, or an organic material layer, or a laminated layer made of an organic material and a reflective material.

Furthermore, the step of forming a transparent adjusting layer on the transparent substrate having the grating formed thereon comprises:
blade or spin coating a transparent material on the transparent substrate having the grating formed thereon and then thermally curing the transparent material to form the transparent adjusting layer; or
blade or spin coating a transparent material on the transparent substrate having the grating formed thereon and then UV curing the transparent material to form the transparent adjusting layer; or
blade or spin coating a transparent material on the transparent substrate having the grating formed thereon and then UV pre-curing, followed by thermally curing the transparent material, to form the transparent adjusting layer; or
depositing a non-metal transparent material on the transparent substrate having the grating formed thereon using CVD process to form the transparent adjusting layer; or
depositing a transparent metal material on the transparent substrate having the grating formed thereon using sputtering process to form the transparent adjusting layer.

Furthermore, a thickness of the transparent adjusting layer is 0-500 μm.

Furthermore, the method further comprises the following steps before forming the transparent adjusting layer on the transparent substrate having the grating formed thereon:
obtaining a width of a sub-pixel of the pixel layer and a aperture size of the grating;
determining the thickness of the transparent adjusting layer according to the width of the sub-pixel and the aperture size.

Furthermore, a distance between the grating and the pixel layer, that is, the thickness h of the transparent adjusting layer, is determined according to the following equation:

$$h = \tfrac{1}{2}\sqrt{(a-m)(Ps+m-a)};$$

where each sub-pixel of the pixel layer is made of a color filter element and a black matrix, the black matrix has a width of m, the color filter element has a width of p, each sub-pixel has a width of $Ps = p + m$, and the aperture size of the grating is a.

furthermore, $h = Ps/4$.

Another embodiment of the invention further provides a two-way viewing angle display panel comprising:
a transparent substrate;
a grating made of a light-shield layer on the transparent substrate;
a transparent adjusting layer on the transparent substrate having the grating formed thereon; and
a pixel layer and a transparent conductive layer on the transparent adjusting layer.

Furthermore, a distance between the grating and the pixel layer, that is, a thickness of the transparent adjusting layer, is:

$$h = \tfrac{1}{2}\sqrt{(a-m)(Ps+m-a)};$$

where each sub-pixel of the pixel layer is made of a color filter element and a black matrix, the black matrix has a width of m, the color filter element has a width of p, each sub-pixel has a width of Ps=p+m, and the aperture size of the grating is a.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
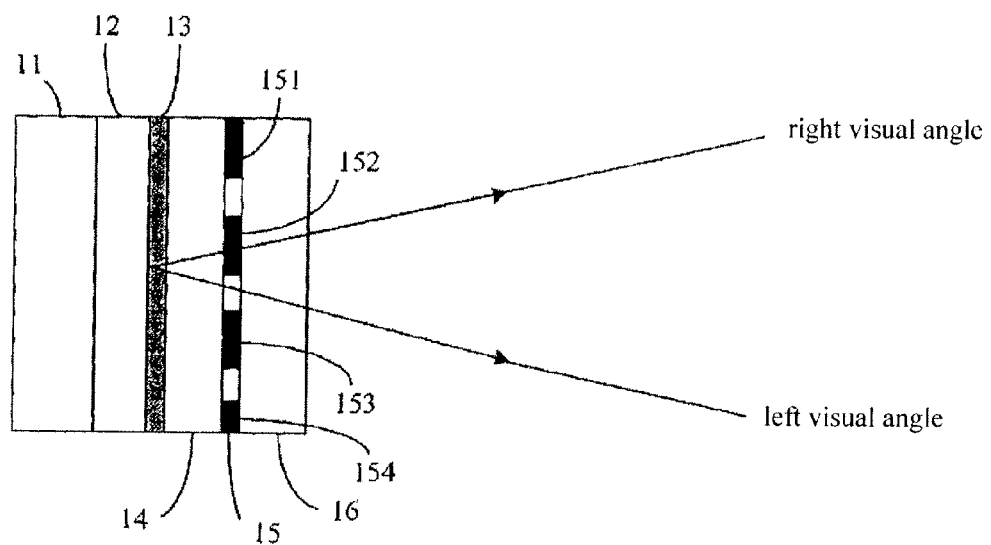
FIG. 1 schematically illustrates a configuration of a conventional two-way viewing angle display.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

According to conventional technologies, the thickness of the second substrate is reduced to optimize the two-way viewing angles. However, reduction in the thickness of the second substrate will produce various problems during manufacture, such as decrease in flatness of the substrate, breaking of the substrate, failure in liquid crystal filling and the like, and thus significantly reduce the yield rate of the products. To address the above problems, embodiments of the invention provide a two-way viewing angle display panel and its fabrication method which may optimize the two-way viewing angles and avoid the yield rate issue caused by reducing the thickness of the substrate.

An embodiment of the invention provides a method for fabricating a two-way viewing angle display panel, the method comprises:

Providing a transparent substrate 17;

Forming a grating 18 made of a light-shield layer on the transparent substrate 17;

Forming a transparent adjusting layer 19 on the transparent substrate 17 having the grating 18 formed thereon;

Sequentially forming a pixel layer 13 and a transparent conductive layer 20 on the transparent adjusting layer 19.

According to the embodiment of the method for fabricating the two-way viewing angle display panel of the invention, the grating made of the light-shield layer is formed on the transparent substrate, followed by forming the transparent adjusting layer on the transparent substrate having the grating, and then forming the pixel layer on the transparent adjusting layer. In the technical solution of the invention, the grating of the two-way viewing angle display panel is positioned on the inner side of the substrate and is separated from the pixel layer by the transparent adjusting layer. Therefore, the distance between the grating and the pixel layer may be adjusted by adjusting the thickness of the transparent adjusting layer, thereby optimizing the two-way view angle. Moreover, it is not needed to reduce the thickness of the substrate, thereby avoiding the yield rate problem cause by thinned substrate.

Figure 2:
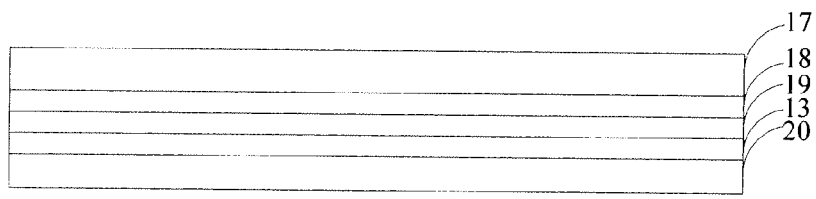
FIG. 2 schematically illustrates a configuration of a two-way viewing angle display panel in accordance with an embodiment of the invention.

After the completion of the above described steps, a two-way viewing angle display panel as illustrated in FIG. 2 is obtained, which comprises:

a transparent substrate 17, a grating 18 made of a light-shield layer on the transparent substrate 17;

a transparent adjusting layer 19 on the transparent substrate 17 having the grating 18 formed thereon;

a pixel layer 13 and a transparent conductive layer 20 on the transparent adjusting layer 19.

In the two-way viewing angle display panel according to the embodiment of the invention, the grating is positioned on the inner side of the substrate and is separated from the pixel layer by the transparent adjusting layer. Therefore, the distance between the grating and the pixel layer may be adjusted by adjusting the thickness of the transparent adjusting layer, thereby optimizing the two-way viewing angle. Moreover, it is not needed to reduce the thickness of the substrate, thereby avoiding the yield rate problem cause by thinned substrate.

Figure 3:
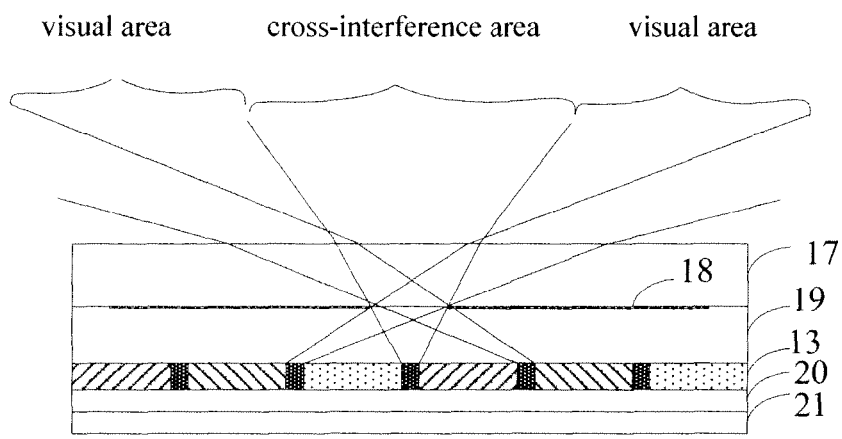
FIG. 3 schematically illustrates a visual area of a two-way viewing angle display panel in accordance with an embodiment of the invention.

FIG. 3 schematically illustrates a visual area of a two-way viewing angle display panel in accordance with an embodiment of the invention. As shown in FIG. 3, light from a backlight source 21 pass through the grating 18 to form a left visual area and a right visual area, as well as a cross-interference area in which both the left and right images may be seen. The cross-interference area will be narrowed accordingly, if the left and right visual areas may be enlarged to their most.

Figure 4:
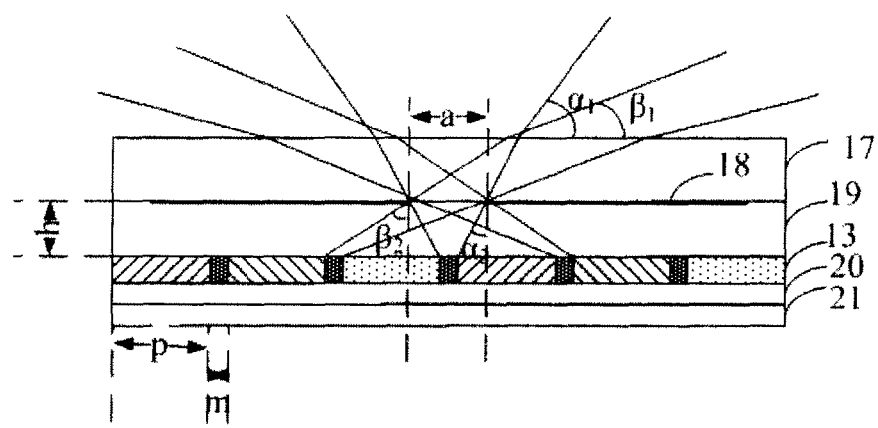
FIG. 4 schematically illustrates visual angles of a two-way viewing angle display panel in accordance with an embodiment of the invention.

In the configuration, the size of the visual area is related to the size of apertures and positioning height of the grating. Accordingly, an embodiment of the invention proposes a solution for designing a configuration of the two-way viewing angle display panel such that the visual area is maximized. FIG. 4 schematically illustrates visual angles of a two-way viewing angle display panel in accordance with an embodiment of the invention. As shown in FIG. 4, the left and right visual angles of the two-way viewing angle display panel are symmetrical and a central axis of a grating aperture at the symmetrical center of the grating is aligned with a black matrix on a vertical central axis of the pixel layer 13, thereby ensuring the symmetry of the left and right visual angles.

As shown in FIG. 4, each sub-pixel of the pixel layer comprises a color filter element having a width of p and a black matrix having a width of m, thus, a width Ps of the sub-pixel is Ps=p+m. Moreover, the aperture size of the grating is a, the distance between the grating and the pixel layer, that is, the thickness of the transparent adjusting layer, is h, the refractive index of the transparent substrate is n and an actual visual angle of the two-way viewing angle display is $(\alpha_1-\beta_1)$. It is known from the refraction law that:

$$\sin(90°-\alpha_1)=n \sin \alpha_2 \tag{1}$$

$$\sin(90°-\beta_1)=n \sin \beta_2 \tag{2}$$

Moreover, $\tan \alpha_2=(a-m)/2/h=(a-m)/2h$ (3)

$$\tan \beta_2=(m+p-(a-m)/2)/h=(3m+2p-a)/2h \tag{4}$$

From which it is deduced that:

$$\cos\alpha_1 = n\sin\alpha_2 = \frac{n(a-m)}{\sqrt{(a-m)^2 + (2h)^2}} \quad (5)$$

$$\cos\beta_1 = n\sin\beta_2 = \frac{n(3m+2p-a)}{\sqrt{(3m+2p-a)^2 + (2h)^2}} \quad (6)$$

Where the transparent substrate is made of glass or an organic material having a refractive index n of 1~1.5. For simplicity, it is assumed that n is 1, thus:

$$\sin(\alpha_1 - \beta_1) = \sin\alpha_1 \cos\beta_1 - \cos\alpha_1 \sin\beta_1 \quad (7)$$

$$= \frac{2h}{\sqrt{(a-m)^2 + (2h)^2}} \frac{3m+2p-a}{\sqrt{(3m+2p-a)^2 + (2h)^2}} -$$

$$\frac{a-m}{\sqrt{(a-m)^2 + (2h)^2}} \frac{2h}{\sqrt{(3m+2p-a)^2 + (2h)^2}}$$

$$= \frac{4(2m+p-a)h}{\sqrt{(a-m)^2 + (2h)^2}\sqrt{(3m+2p-a)^2 + (2h)^2}}$$

$$= \frac{4m+2p-2a}{\sqrt{\frac{(a-m)^2(3m+2p-a)^2}{(2h)^2} + (3m+2p-a)^2 + (a-m)^2 + (2h)^2}}$$

For the function $$f(h) = \frac{(a-m)^2(3m+2p-a)^2}{(2h)^2} + (2h)^2 \quad (8)$$

it is easily known according to knowledge of functions that $f(h)$ has a minimum value and $\sin(\alpha_1-\beta_1)$ has a maximum value when $(a-m)(3m+2p-a)=(2h)^2$. In that case the following may be deduced:

$$\sin(\alpha_1 - \beta_1) = \frac{4m+2p-2a}{\sqrt{\frac{(a-m)^2(3m+2p-a)^2}{(2h)^2} + (3m+2p-a)^2 + (a-m)^2 + (2h)^2}} \quad (9)$$

$$= \frac{4m+2p-2a}{\sqrt{((3m+2p-a)+(a-m))^2}}$$

$$= \frac{4m+2p-2a}{(2m+2P)}$$

$$= \frac{2m+p-a}{m+p}$$

While the distance Ps between two sub-pixels is Ps=p+m, therefore, $$\sin(\alpha_1 - \beta_1) = \frac{2m+p-a}{m+p} \quad (10)$$

$$= \frac{Ps+m-a}{Ps}$$

$$= 1 + \frac{m-a}{Ps}$$

Here $h = \frac{1}{2}\sqrt{(a-m)(Ps+m-a)}$ (11).

Therefore, it is known from equation (10) that for a given display panel with a constant value Ps, the visual angles may be increased by appropriately increasing the width m of the black matrix and reducing the aperture size a.

It is seen from equations (8) and (11) that when the positional height h of the grating is $\frac{1}{2}\sqrt{(a-m)(Ps+m-a)}$, or as close to such a height as possible when other optical conditions are met, an optimal visual angle may be achieved.

Moreover, the central-interference angle is 2 (90°−$\alpha_1$), and $$\sin(90° - \alpha_1) = n\sin\alpha_2$$

$$= \frac{n(a-m)}{\sqrt{(a-m)^2 + (2h)^2}}$$

$$= \frac{n}{\sqrt{1 + \left(\frac{2h}{a-m}\right)^2}}$$

Thus, the central-interference angle will be decreased when the grating aperture a is reduced and the width m of the black matrix is increased, while the central-interference angle will be increased when h is reduced.

However, the following holds for h:

$$h = \frac{1}{2}\sqrt{(a-m)(Ps+m-a)} \leq \frac{1}{2}\left(\frac{(a-m)+(Ps+m-a)}{2}\right)$$

$$= \frac{Ps}{4}.$$

In summary, a relatively large visual angle and a relatively small central-interference angle may be obtained when h=Ps/4. Thus, the positioning height of the grating (that is, the thickness of the transparent adjusting layer) should be as close as possible to Ps/4 when fabricating a given two-way viewing angle display panel.

In the following, a method for fabricating the two-way viewing angle display panel in accordance with an embodiment of the invention will be described in detail in connection with FIGS. 5 to 10.

Figure 5:
FIGS. 5 to 10 illustrate a process of a method for fabricating a two-way viewing angle display panel in accordance with an embodiment of the invention.

Step 1: as illustrated in FIG. 5, a transparent substrate 17 is provided, which is cleaned before the fabrication. A material of the transparent substrate 17 may be glass or an organic material.

Figure 6:

Step 2: as illustrated in FIG. 6, a mask is used to form a grating 18 made of a light-shield layer on the transparent substrate 17. Please note that the mask includes not only a pattern for making the grating but also process marks needed for making the display panel, such as a polyimide (PI) mark, a seal mark, a cutting mark, an alignment mark for the mask and a mask carrier as well as a glass platform, and an alignment mark for the black matrices and color filter elements for forming the pixel layer.

Conventionally, the process marks needed for fabricating the display panel are formed at the same time with the pixel layer. In the embodiment of the invention, if the process marks needed for fabricating the display panel are formed at the same time of forming the pixel layer, the process marks may affect the display of the grating aperture area. Thus, in the embodiment, the process marks are formed at the same time when the grating is formed.

In the above configuration, the light-shield layer is made of an opaque material, for example, it may be a black metal layer made of chromium (Cr). Alternatively, the light-shield layer is made of the same organic material as the black matrix. Furthermore, the light-shield layer may be a laminated layer of an organic material layer and a reflector layer, where the reflector layer may reflect light to improve the transmittance and usage of the light, thereby improving the display brightness of the two-way viewing angle display panel. Here, the reflector layer may be made of aluminum (Al), for example.

Figure 7:
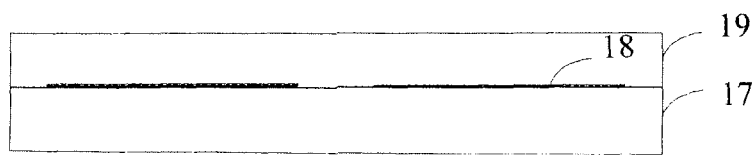

Step 3: as illustrated in FIG. 7, a transparent adjusting layer 19 may be formed on the transparent substrate 17 having the grating 18 formed thereon by blade coating or spin coating.

The ways in which the transparent adjusting layer 19 may be formed are listed as below:

a transparent material is blade or spin coated on the transparent substrate 17 having the grating 18 formed thereon, and then thermally cured to form the transparent adjusting layer 19; or a transparent material is blade or spin coated on the transparent substrate 17 having the grating 18 formed thereon, and then UV cured to form the transparent adjusting layer 19; or a transparent material is blade or spin coated on the transparent substrate 17 having the grating 18 formed thereon and then UV pre-cured and followed by thermal cure to form the transparent adjusting layer 19; or a non-metal transparent material is deposited on the transparent substrate 17 having the grating 18 formed thereon using CVD to form the transparent adjusting layer 19; or a transparent metal material is sputtered on the transparent substrate 17 having the grating 18 formed thereon to form the transparent adjusting layer 19.

The transparent adjusting layer 19 may adjust the distance between the grating 18 and the pixel layer 13. The thickness of the transparent adjusting layer 19 may be for example 0-500 μm. Specifically, the thickness of the transparent adjusting layer 19 may be determined by the design in accordance with the embodiments of the invention described above. A material of the transparent adjusting layer may be an insulating material or a metal material. When the grating 18 is made of an insulating material, the transparent adjusting layer 19 may use a metal material, thereby providing a better flatness for the transparent adjusting layer 19.

Figure 8:
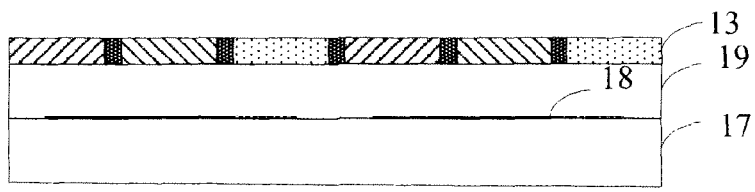

Step 4: as illustrated in FIG. 8, forming black matrices (BM) and color filter elements (RGB) for the pixel layer 13 on the transparent adjusting layer 19 using conventional processes. Please note, for the mask used for forming the black matrices, the peripheral process marks thereon may be omitted while the alignment marks for the black matrix and the grating must be retained, and it should be ensured that the locations of such alignment marks do not influence the alignment marks for the RGB layer and the grating.

Figure 9:
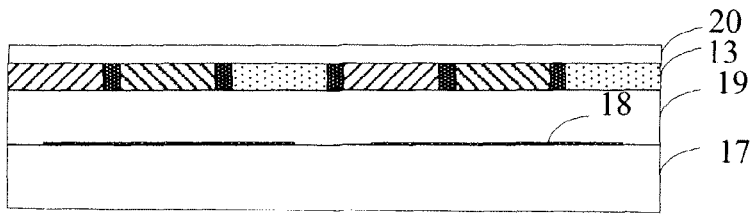

Step 5: as illustrated in FIG. 9, forming a transparent conductive layer 20 on the pixel layer 13, where the transparent conductive layer 20 may be made of ITO.

Figure 10:
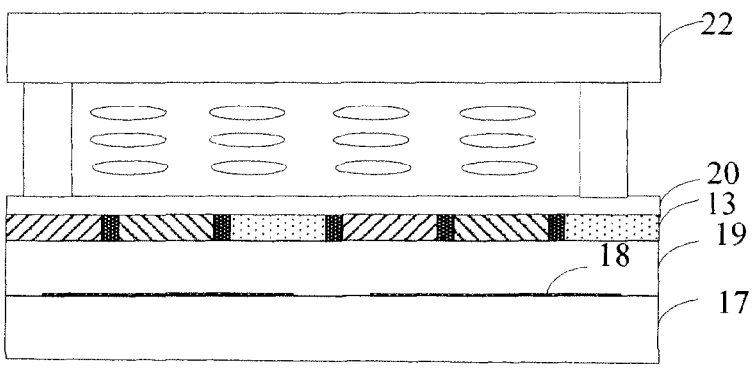

Step 6: as illustrated in FIG. 10, a lower substrate 22 and the substrate 17 having the grating 18, the transparent adjusting layer 19, the pixel layer 13 and the transparent conductive layer 20 formed thereon are assembled using conventional PI rubbing to form a cell and the liquid crystal is filled to form the two-way viewing angle display panel as illustrated in FIG. 10.

According to embodiment of the method for fabricating the two-way viewing angle display panel, the grating of the two-way viewing angle display panel is positioned on the inner side of the substrate and is separated from the pixel layer by the transparent adjusting layer. The thickness of the transparent adjusting layer may be adjusted according to the designed parameters of a given display panel, thereby optimizing the two-way view angle. Moreover, it is not needed to reduce the thickness of the substrate, thereby avoiding the yield rate problem caused by thinned substrate.

In the method embodiments of the invention, the sequential number of each step is not used to limit the order of the steps. Instead, the order of the steps may be changed by those skilled in the art without any inventive effort and is thus under the protection of the invention.

What are described above is related to the illustrative embodiments of the disclosure only and not limitative to the scope of the disclosure; the scopes of the disclosure are defined by the accompanying claims.

What is claimed is:

1. A method for fabricating a two-way viewing angle display panel, comprising:
   providing a transparent substrate;
   forming a grating made of a light-shield layer on the transparent substrate;
   forming a transparent adjusting layer on the transparent substrate having the grating formed thereon; and
   sequentially forming a pixel layer and a transparent conductive layer on the transparent adjusting layer;
   wherein the step of forming a grating made of a light-shield layer on the transparent substrate comprises:
   forming alignment marks for the grating and the pixel layer on the substrate at the same time by using the same mask plate.

2. The method for fabricating a two-way viewing angle display panel of claim 1, wherein the light-shield layer is a black metal layer, or an organic material layer, or a laminated layer made of an organic material and a reflective material.

3. The method for fabricating a two-way viewing angle display panel of claim 1, wherein the step of forming a transparent adjusting layer on the transparent substrate having the grating formed thereon comprises:
   blade or spin coating a transparent material on the transparent substrate having the grating formed thereon and then thermally curing the transparent material to form the transparent adjusting layer; or
   blade or spin coating a transparent material on the transparent substrate having the grating formed thereon and then UV curing the transparent material to form the transparent adjusting layer; or
   blade or spin coating a transparent material on the transparent substrate having the grating formed thereon and then UV pre-curing, followed by thermally curing the transparent material to form the transparent adjusting layer; or
   depositing a non-metal transparent material on the transparent substrate having the grating formed thereon using CVD process to form the transparent adjusting layer; or
   depositing a transparent metal material on the transparent substrate having the grating formed thereon using sputtering process to form the transparent adjusting layer.

4. The method for fabricating a two-way viewing angle display panel of claim 1, wherein a thickness of the transparent adjusting layer is 0-500 μm.

5. The method for fabricating a two-way viewing angle display panel of claim 1, further comprises the following steps before forming the transparent adjusting layer on the transparent substrate having the grating formed thereon:
   obtaining a width of a sub-pixel of the pixel layer and a aperture size of the grating;
   determining the thickness of the transparent adjusting layer according to the width of a sub-pixel and the aperture size.

6. The method for fabricating a two-way viewing angle display panel of claim 5, wherein a distance between the grating and the pixel layer, that is, the thickness h of the transparent adjusting layer, is determined according to the following equation:

$$h = \tfrac{1}{2}\sqrt{(a-m)(Ps+m-a)};$$

where each sub-pixel of the pixel layer is made of a color filter element and a black matrix, the black matrix has a width of m, the color filter element has a width of p, each sub-pixel has a width of Ps=p+m, and the aperture size of the grating is a.

7. The method for fabricating a two-way viewing angle display panel of claim 6, wherein h=Ps/4.

8. A two-way viewing angle display panel comprising:
   a transparent substrate;
   a grating made of a light-shield layer on the transparent substrate;
   a transparent adjusting layer on the transparent substrate having the grating formed thereon; and
   a pixel layer and a transparent conductive layer on the transparent adjusting layer,
   wherein a distance between the grating and the pixel layer, that is, a thickness of the transparent adjusting layer, is:

$$h = \tfrac{1}{2}\sqrt{(a-m)(Ps+m-a)};$$

where each sub-pixel of the pixel layer is made of a color filter element and a black matrix, the black matrix has a width of m, the color filter element has a width of p, each sub-pixel has a width of Ps=p+m, and the aperture size of the grating is a.

9. The method for fabricating a two-way viewing angle display panel of claim 2, wherein the step of forming a transparent adjusting layer on the transparent substrate having the grating formed thereon comprises:
   blade or spin coating a transparent material on the transparent substrate having the grating formed thereon and then thermally curing the transparent material to form the transparent adjusting layer; or
   blade or spin coating a transparent material on the transparent substrate having the grating formed thereon and then UV curing the transparent material to form the transparent adjusting layer; or
   blade or spin coating a transparent material on the transparent substrate having the grating formed thereon and then UV pre-curing, followed by thermally curing the transparent material to form the transparent adjusting layer; or
   depositing a non-metal transparent material on the transparent substrate having the grating formed thereon using CVD process to form the transparent adjusting layer; or
   depositing a transparent metal material on the transparent substrate having the grating formed thereon using sputtering process to form the transparent adjusting layer.

10. The method for fabricating a two-way viewing angle display panel of claim 2, wherein a thickness of the transparent adjusting layer is 0-500 μm.

11. The method for fabricating a two-way viewing angle display panel of claim 3, wherein a thickness of the transparent adjusting layer is 0-500 μm.

12. The method for fabricating a two-way viewing angle display panel of claim 2, further comprises the following steps before forming the transparent adjusting layer on the transparent substrate having the grating formed thereon:
   obtaining a width of a sub-pixel of the pixel layer and a aperture size of the grating;
   determining the thickness of the transparent adjusting layer according to the width of a sub-pixel and the aperture size.

13. The method for fabricating a two-way viewing angle display panel of claim 3, further comprises the following steps before forming the transparent adjusting layer on the transparent substrate having the grating formed thereon:
   obtaining a width of a sub-pixel of the pixel layer and a aperture size of the grating;
   determining the thickness of the transparent adjusting layer according to the width of a sub-pixel and the aperture size.

14. The method for fabricating a two-way viewing angle display panel of claim 4, further comprises the following steps before forming the transparent adjusting layer on the transparent substrate having the grating formed thereon:
   obtaining a width of a sub-pixel of the pixel layer and a aperture size of the grating;
   determining the thickness of the transparent adjusting layer according to the width of a sub-pixel and the aperture size.

* * * * *